C. H. THOMPSON.
ADJUSTABLE BRAKE LEVER.
APPLICATION FILED APR. 24, 1911.
1,088,247.
Patented Feb. 24, 1914.
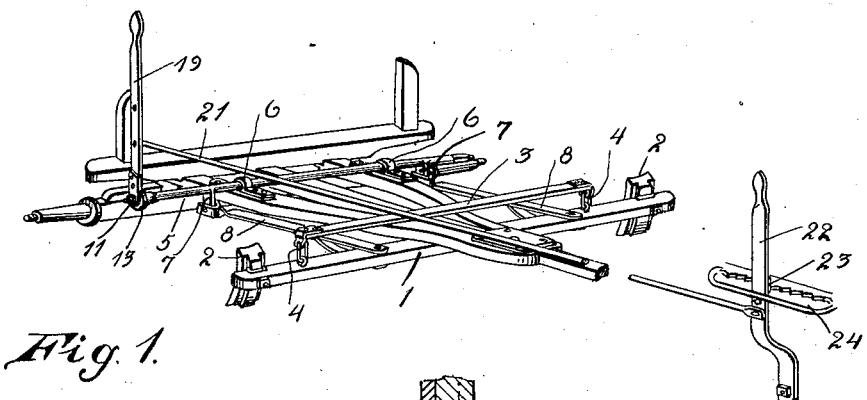
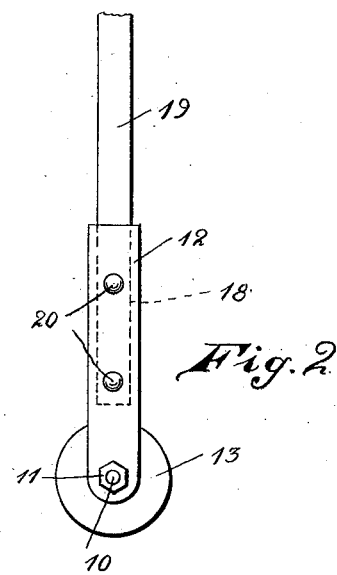
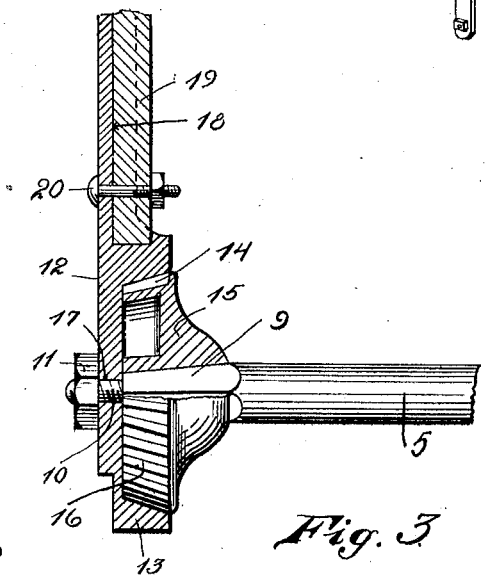
Inventor
Charles H. Thompson.
Witnesses
J. Milton Jester
B. W. Fishburne
By
C. L. Parker.
Attorney

UNITED STATES PATENT OFFICE.

CHARLES H. THOMPSON, OF LYNCHBURG, VIRGINIA, ASSIGNOR TO THORNHILL WAGON COMPANY, OF LYNCHBURG, VIRGINIA, A CORPORATION OF VIRGINIA.

ADJUSTABLE BRAKE-LEVER.

1,088,247. Specification of Letters Patent. Patented Feb. 24, 1914.

Application filed April 24, 1911. Serial No. 622,952.

*To all whom it may concern:*

Be it known that I, CHARLES H. THOMPSON, a citizen of the United States, residing at Lynchburg, in the county of Campbell and State of Virginia, have invented certain new and useful Improvements in Adjustable Brake-Levers, of which the following is a specification.

This invention relates to adjustable brake levers and has particular reference to such devices to be used in connection with a wagon or the like.

The invention aims to provide novel means for adjustably securing a lever to a rock shaft employed in applying brakes, and more particularly to such means formed of co-acting clutch members constructed to fit one within the other so that the teeth of said clutch members are properly protected and hence making it possible for the device to be of long life and the co-acting clutch members to be easily separated to adjust the lever for changing its position with relation to the rock shaft. By my construction both of the co-acting clutch members may be removed from the rock shaft for the purpose of repair or for substituting new members.

Other objects and advantages of this invention will be apparent during the course of the following description.

In the accompanying drawings forming a part of this specification and in which like numerals are employed to designate like parts throughout the same, Figure 1 is a perspective view of my adjustable brake lever and associated members, showing the same in connection with the running gear of a wagon, Fig. 2 is an outer side view of the brake lever, and, Fig. 3 is a central longitudinal sectional view taken through the same.

In the drawings, wherein is illustrated a preferred embodiment of my invention, the numeral 1 designates a brake bar carrying brake shoes 2 at its opposite ends. This brake bar is suspended from a support bar 3 by means of links 4, whereby the brake bar 1 is capable of movement in a horizontal plane toward and away from the rear wheels (not shown) of the wagon. The support bar 3 is suitably attached to the rear portion of the running gear.

The numeral 5 designates a rock shaft, journaled through brackets 6 which are mounted upon the running gear, and provided near its ends with depending cranks 7. These cranks have pivotal connection with forwardly extending bars 8, having forked ends which are pivotally connected with the brake bar 1.

As clearly shown in Fig. 3, the rock shaft 5 has its end portion tapered and formed square in cross-section or any other shape other than round, as indicated at 9. The tapered portion 9 carries at its outer end a reduced cylindrical screw-threaded portion 10 adapted for the reception of a nut 11. The rock shaft 5 is turned by means of an adjustable brake lever comprising a body portion 12, upon the lower end of which is rigidly mounted a preferably circular head 13 that may be preferably cast integral with said body portion. This head 13 is provided upon its inner face with a frusto-conical opening formed therein, the circumferential wall of which is provided with teeth 14. The head 13 forms one co-acting member of a clutch.

The numeral 15 designates a casting or head, serving as the other co-acting member of the clutch. The head 15 is provided with an axial opening formed therethrough corresponding in shape in cross-section to the portion 9 of the rock shaft and adapted to snugly receive such portion. The head 15 cannot rotate on the rock shaft 5. The outer portion of the head 15 is formed frusto-conical, as shown, and is adapted for insertion within the frusto-conical opening formed in the head 13. The frusto-conical portion of the head 15 is provided with teeth 16 adapted to intermesh with the teeth 14. The head 13 has an opening 17 formed therethrough, for the reception of the reduced screw-threaded portion 10. The body portion 12 of the adjustable brake lever has its inner face provided with a longitudinal recess or groove 18, within which is disposed an arm 19, held in place by bolts 20. Pivotally connected with the arm 19 is a rod 21, extending forwardly for pivotal connection with a manually operated lever 22, carrying a latch 23 to coöperate with a rack 24.

When the brake lever is rigidly locked with the rock shaft 5, the same may be oscillated for applying the brakes by proper manipulation of the lever 22, the movement of the rock shaft 5 being transmitted to the brake bar 1 through the intermediate connections. As the brake shoes wear away and become thinner, it is found desirable to lock the brake lever at a different radial position with relation to the rock shaft 5. The radial adjustment of the brake lever with relation to the rock shaft 5, is effected by removing the nut 11 and disengaging the co-acting clutch members or heads 13 and 15. The desired position of the brake lever having been obtained, the clutch members 13 and 15 are again placed in locked engagement and the nut 11 screwed in place to retain such engagement. From the construction of the above referred to parts, it is obvious that the clutch members 13 and 15 may be readily separated not only from each other but from the portion 9 of the rock shaft.

I wish it understood that the form of my invention herewith shown and described is to be taken as a preferred example of the same and that certain changes in the shape, size and arrangement of parts may be resorted to without departing from the spirit of the invention or the scope of the subjoined claim.

Having thus described my invention, I claim:—

The combination with a rock-shaft having one end thereof tapered, decreasing in cross sectional area outwardly, formed polygonal in cross-section, and provided at its outer end with a reduced screw-threaded extension; of a separate head provided with a main central tapered opening for receiving the tapered end portion of the rock-shaft and carrying teeth upon its periphery; a separate disk provided with a main recess for receiving the head, having teeth formed upon the inner wall of its periphery to engage with the first named teeth and centrally apertured to receive the screw-threaded extension; a grooved crank carried by the outer face of the disk and having the inner end thereof arranged radially with relation to the disk and extending past the central aperture thereof to reinforce the disk; a nut carried by the screw-threaded extension and engaging the inner end of the crank for holding the several parts of the apparatus together; a lever mounted within the groove of the crank; and means to secure the lever within the groove.

In testimony whereof I affix my signature in presence of two witnesses.

CHARLES H. THOMPSON.

Witnesses:
B. B. LANGHORN,
E. H. BROWN.

---

Copies of this patent may be obtained for five cents each, by addressing the "Commissioner of Patents, Washington, D. C."